US010046848B2

(12) United States Patent
Folch Cortes et al.

(10) Patent No.: US 10,046,848 B2
(45) Date of Patent: Aug. 14, 2018

(54) AIRCRAFT REAR STRUCTURE

(71) Applicants: Airbus Operations (SAS), Toulouse (FR); Airbus Operations S.L., Getafe (ES)

(72) Inventors: Diego Folch Cortes, Getafe (ES); Esteban Martino Gonzalez, Getafe (ES); Jose Antonio Mariblanca Lopez, Getafe (ES); Lionel Diochon, Toulouse (FR)

(73) Assignees: AIRBUS OPERATIONS S.L., Getafe (ES); AIRBUS OPERATIONS SAS, Toulouse (FR)

( * ) Notice: Subject to any disclaimer, the term of this patent is extended or adjusted under 35 U.S.C. 154(b) by 94 days.

(21) Appl. No.: 15/089,675

(22) Filed: Apr. 4, 2016

(65) Prior Publication Data

US 2016/0297510 A1 Oct. 13, 2016

(30) Foreign Application Priority Data

Apr. 8, 2015 (EP) .................................... 15382169

(51) Int. Cl.
*B64C 1/26* (2006.01)
*B64C 1/10* (2006.01)
*B64C 5/02* (2006.01)
*B64C 5/06* (2006.01)

(52) U.S. Cl.
CPC ................. *B64C 1/26* (2013.01); *B64C 1/10* (2013.01); *B64C 5/02* (2013.01); *B64C 5/06* (2013.01)

(58) Field of Classification Search
CPC .... B64C 1/26; B64C 5/06; B64C 5/10; B64C 5/12; B64C 5/14
See application file for complete search history.

(56) References Cited

U.S. PATENT DOCUMENTS

| 3,666,211 | A | * | 5/1972 | Cathers | B64D 27/20 244/120 |
| 4,448,372 | A | * | 5/1984 | Larson | B64C 1/26 244/117 R |
| 7,562,845 | B2 | * | 7/2009 | Schoene | B64C 1/065 244/119 |

(Continued)

FOREIGN PATENT DOCUMENTS

| EP | 1550606 | 7/2005 |
| EP | 2098448 | 9/2009 |
| KR | 100843170 | 7/2008 |

OTHER PUBLICATIONS

European Search Report, dated Sep. 24, 2015, priority document.

*Primary Examiner* — Joseph W Sanderson
(74) *Attorney, Agent, or Firm* — Greer, Burns & Crain, Ltd.

(57) ABSTRACT

An aircraft rear structure comprising a substantially flat rear pressure bulkhead, with a first side and a second side, opposite to the first side. The aircraft rear structure also comprises a horizontal stabilizer and a vertical stabilizer which in turn comprises a first spar and a second spar. The first spar is attached to a first attachment zone of the second side of the rear pressure bulkhead via first attaching elements, and the second spar is attached to a second attachment zone of the second side of the rear pressure bulkhead via second attaching elements. The second attachment zone being different from the first attachment zone.

5 Claims, 6 Drawing Sheets

(56) References Cited

U.S. PATENT DOCUMENTS

| | | | |
|---|---|---|---|
| 8,177,166 B2* | 5/2012 | Haack | B64C 1/061 |
| | | | 244/119 |
| 8,360,359 B2* | 1/2013 | Llamas Sandin | B64C 1/26 |
| | | | 244/87 |
| 8,746,616 B2* | 6/2014 | Barmichev | B64C 1/10 |
| | | | 244/102 R |
| 9,162,748 B2* | 10/2015 | Brunken, Jr. | B64C 1/26 |
| 9,718,535 B2* | 8/2017 | Llamas Sandin | B64C 9/08 |
| 2005/0151018 A1* | 7/2005 | Schoene | B64C 1/065 |
| | | | 244/131 |
| 2010/0148000 A1 | 6/2010 | Llamas et al. | |
| 2012/0298795 A1* | 11/2012 | Cazals | B64C 5/02 |
| | | | 244/87 |
| 2013/0099053 A1* | 4/2013 | Barmichev | B64C 1/10 |
| | | | 244/102 R |
| 2013/0153708 A1* | 6/2013 | Brunken, Jr. | B64C 1/26 |
| | | | 244/56 |
| 2015/0183509 A1* | 7/2015 | Llamas Sandn | B64C 9/08 |
| | | | 244/87 |
| 2017/0066518 A1* | 3/2017 | Gallant | B64C 1/068 |

* cited by examiner

AIRCRAFT REAR STRUCTURE

CROSS-REFERENCES TO RELATED APPLICATIONS

This application claims the benefit of the European patent application No. 15382169.9 filed on Apr. 8, 2015, the entire disclosures of which are incorporated herein by way of reference.

BACKGROUND OF THE INVENTION

The present invention is related to the field of aircraft parts, more especially to aircraft rear structures.

Several solutions are known for the arrangement of the elements comprised in the aircraft rear zone, in particular, for the arrangement of the vertical stabilizer to the fuselage.

This joint must suit all the dynamic requirements that aircraft usually undergo, including the shear forces due to the aerodynamic load generated in the vertical stabilizer, which is usually attached by one of its ends to a zone in the upper part of the fuselage.

In the aircraft known in the state of art, this attachment is carried out by means of a group of fittings which are arranged on an upper shell structure placed in the fuselage. The shell structure is in turn attached to several frames of the fuselage, and therefore the loads generated in the fittings are transmitted to the main structure of the aircraft.

This way of attachment has been used in aircraft for decades, but means a weight addition to the fuselage structure, due to the security standards that must be met, and due to the fact that fittings usually work on shear, and need to be bigger and stronger to bear these loads.

SUMMARY OF THE INVENTION

The present invention provides a solution for the aforementioned problems by a unique aircraft tail arrangement and an aircraft incorporating this tail arrangement. All the features described in this specification, including the claims, description and drawings, can be combined in any combination, with the exception of combinations of such mutually exclusive features.

According to a first aspect, the invention provides an aircraft rear structure comprising
- a substantially flat rear pressure bulkhead, with a first side and a second side, opposite to the first side,
- a horizontal stabilizer,
- a vertical stabilizer which in turn comprises a first spar and a second spar wherein
- the first spar is attached to a first attachment zone of the second side of the rear pressure bulkhead by means of first attaching elements,
- the second spar is attached to a second attachment zone of the second side of the rear pressure bulkhead by means of second attaching elements,
- the second attachment zone being different from the first attachment zone.

Attaching elements are configured to attach two parts. In particular, these attaching elements may be fittings, bolts, a combination thereof or any similar elements that performs the same technical function.

Advantageously, an aircraft rear structure according to the invention is suitable for being attached to the rest of the aircraft without the use of a shell structure. This saves weight to the aircraft, and redistributes the load to the whole rear pressure bulkhead, instead of focusing the load transmission in a more reduced area located in the top rear part of the aircraft.

A rear pressure bulkhead is one of the surfaces that close the pressurized zone of the aircraft. It is located in the rear part of the aircraft, substantially perpendicular to the fuselage axis.

In the embodiments known in the state of the art, the rear pressure bulkhead is not involved in the attachment of the vertical stabilizer, because in these cases, the vertical stabilizer is attached to a shell placed in the perimeter of the fuselage, and the rear pressure bulkhead is placed covering the cross section of the fuselage. Hence, no interaction between these two elements is known in the prior art.

This embodiment saves the weight of one element to the aircraft, and allows the rest of the aircraft rear structure to be relieved from structural requirements.

In a particular embodiment, the first attachment zone corresponds with the upper zone of the rear pressure bulkhead and the second attachment zone corresponds with the lower zone of the rear pressure bulkhead.

This optimal solution allows a better managing of load distribution along the rear pressure bulkhead.

In a particular embodiment, the first attaching elements comprise first angular fittings and first backfittings and the second attaching elements comprise second angular fittings and second backfittings.

Angular fittings are elements that comprise two support surfaces forming an angle. They are used to attach two different elements which form an angle between them.

Backfittings are elements placed on the back side of an element that has been attached to another element in its rear side, thus securing the attachment. They do not need to fit any particular condition, as they just retain the fixing or fastening element, which is usually a bolt or similar. In a particular embodiment, they have a shape that allows being placed in contact with other surface, thus reinforcing their position.

In a particular embodiment, the first angular fittings attach the first spar to the second side of the rear pressure bulkhead by means of first fastening elements, such as a bolt or similar, and the first backfittings secure these first fastening elements from the first side of the rear pressure bulkhead.

In a particular embodiment, the second angular fittings attach the second spar to the second side of the rear pressure bulkhead by means of second fastening elements, such as a bolt or similar, and the second backfittings secure these second fastening elements from the first side of the rear pressure bulkhead.

In a second inventive aspect, the invention provides an aircraft comprising an aircraft rear structure according to the first inventive aspect.

BRIEF DESCRIPTION OF THE DRAWINGS

These and other characteristics and advantages of the invention will become clearly understood in view of the detailed description of the invention which becomes apparent from preferred embodiments of the invention, given just as an example and not being limited thereto, with reference to the drawings.

DETAILED DESCRIPTION OF THE PREFERRED EMBODIMENTS

Once an object of the invention has been outlined, specific non-limitative embodiments are described hereinafter.

Figure 1:
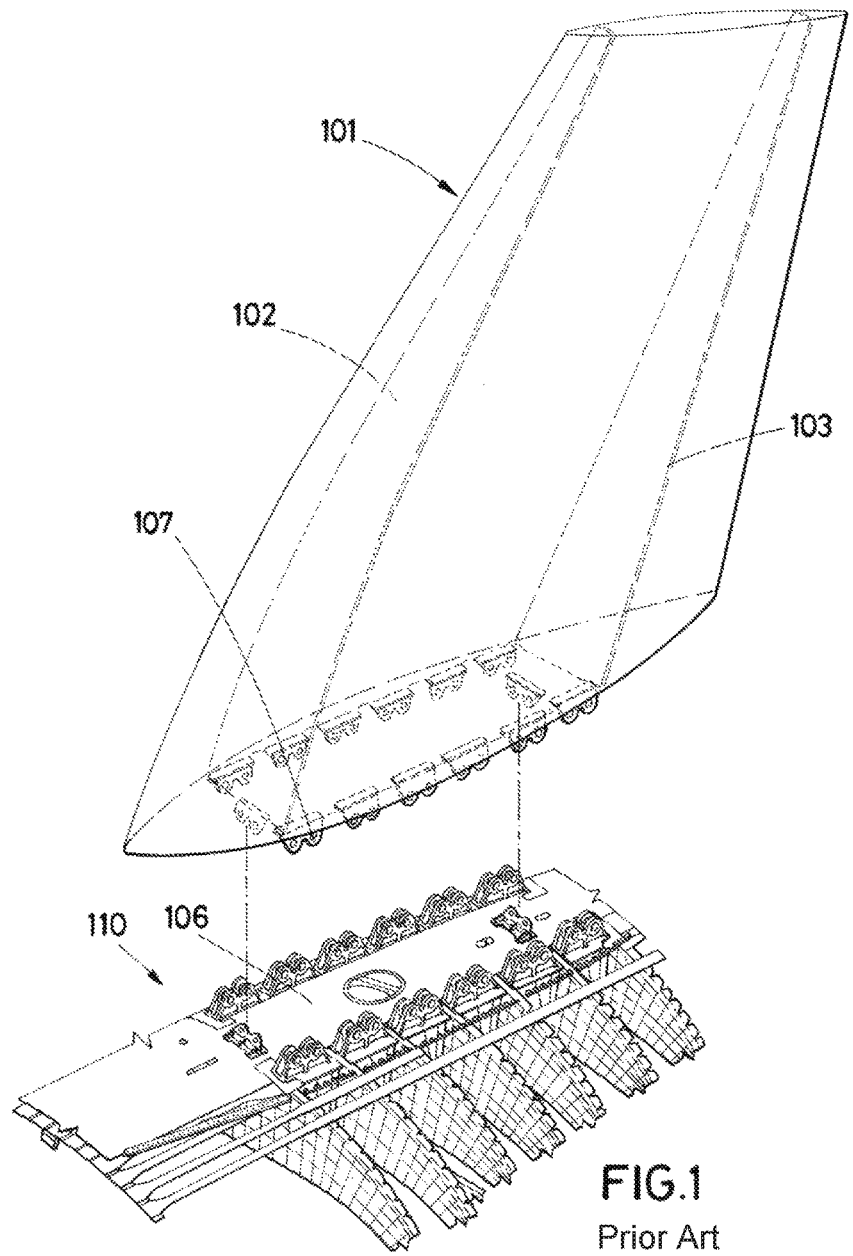
FIG. 1 shows an aircraft rear structure according to the state of the art.

FIG. 1 shows an aircraft rear structure (110) according to the state of the art. In this figure, the vertical stabilizer (101) is attached to a shell structure (106) which is placed on the top part of the fuselage. Both the front spar (102) and the rear spar (103) of the vertical stabilizer (101) according to the state of the art, together with several lateral fittings (107) are attached to the shell structure (106). This shell structure (106) comprise several fittings that receive and transmit the loads generated in the vertical stabilizer (101) to the shell structure (106) and then to the fuselage.

Figure 2:
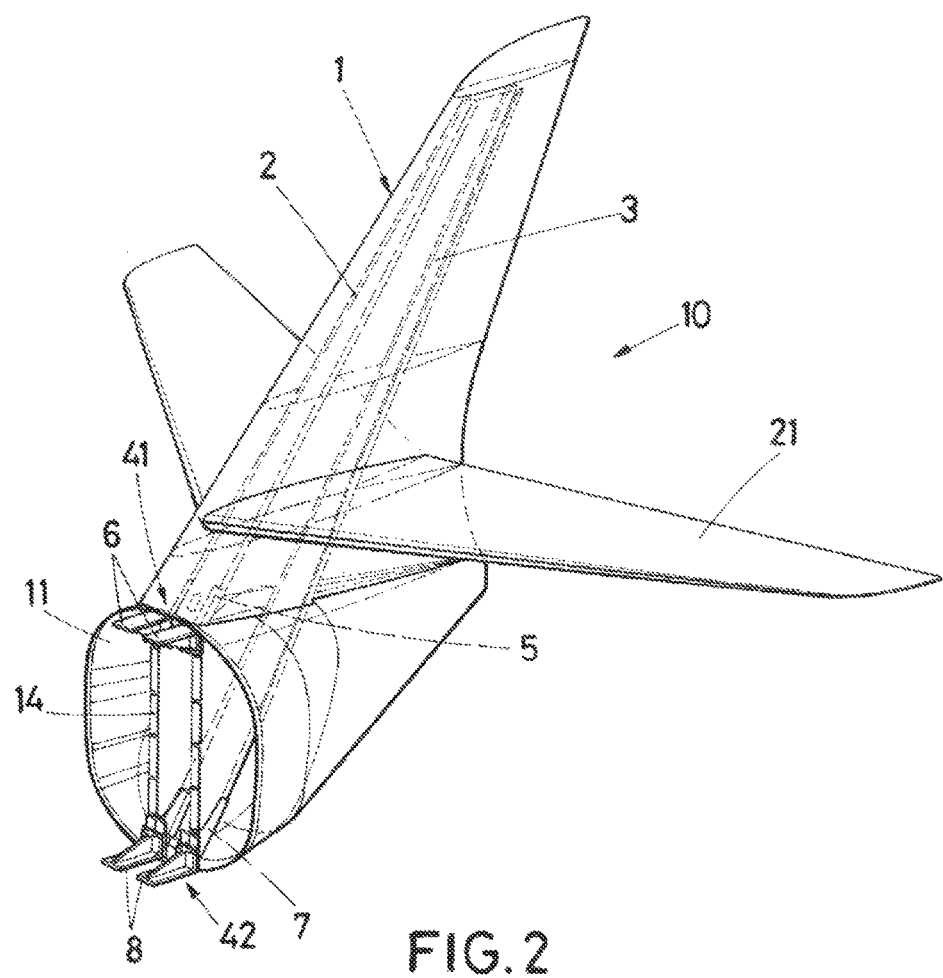
FIG. 2 shows an aircraft rear structure according to the invention.

FIG. 2 shows an aircraft rear structure (10) according to the invention. This aircraft rear structure (10) comprises
  a substantially flat rear pressure bulkhead (11), with a first side and a second side, opposite to the first side,
  a horizontal stabilizer (21),
  a vertical stabilizer (1) which in turn comprises a first spar (2) and a second spar (3),
  wherein
  the first spar (2) is attached to a first attachment zone (41) of the second side of the rear pressure bulkhead (11) via first attaching elements (5, 6),
  the second spar (3) is attached to a second attachment zone (42) of the second side of the rear pressure bulkhead (11) via second attaching elements (7, 8),
  the second attachment zone (42) being different from the first attachment zone (41).

In this figure, it can be observed how the first attachment zone (41) corresponds with the upper zone of the rear pressure bulkhead (11) and the second attachment zone (42) corresponds with the lower zone of the rear pressure bulkhead (11).

In this figure, central angular fittings (14) located on the second side of the rear pressure bulkhead (11) are also observed.

The vertical stabilizer is therefore not attached to a shell that comprises a multitude of heavy fittings, but to the rear pressure bulkhead (11). The interaction between the attachment of the first and second spar of the vertical stabilizer and the location of the rear pressure bulkhead allows a symbiotic reinforcement of both attachments.

Figure 3:
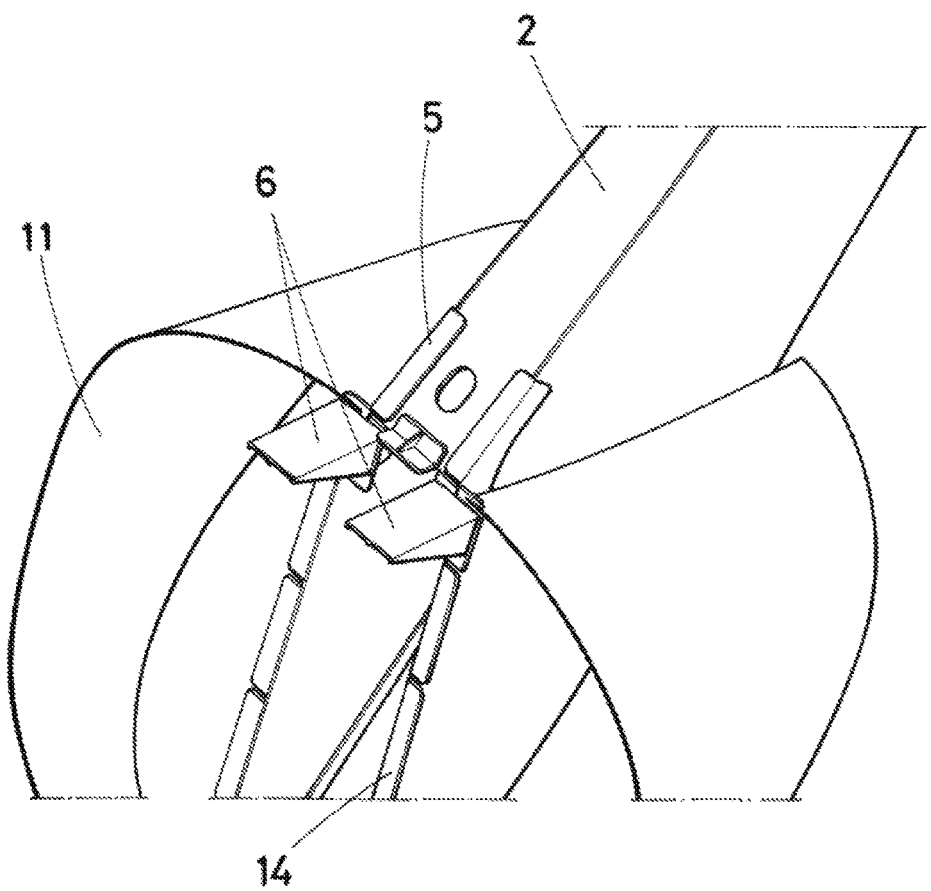
FIG. 3 shows a detail of the attachment of the vertical stabilizer in an aircraft rear structure according to the invention.

In particular embodiments, the attachments between the spars of the vertical stabilizer and the rear pressure bulkhead are performed via first attaching elements and second attaching elements. FIG. 3 shows a detail of the first attaching elements used in a particular embodiment of the aircraft rear structure according to the invention. In this figure, it can be seen how the first attaching elements comprise first angular fittings (5) and first backfittings (6), and the first angular fittings (5) attaching the first spar (2) to the second side of the rear pressure bulkhead (11) via first fastening elements (not shown) and the first backfittings (6) securing these first fastening elements from the first side of the rear pressure bulkhead (11). In this figure, central angular fittings (14) located on the second side of the rear pressure bulkhead (11) are also observed.

Figure 4:
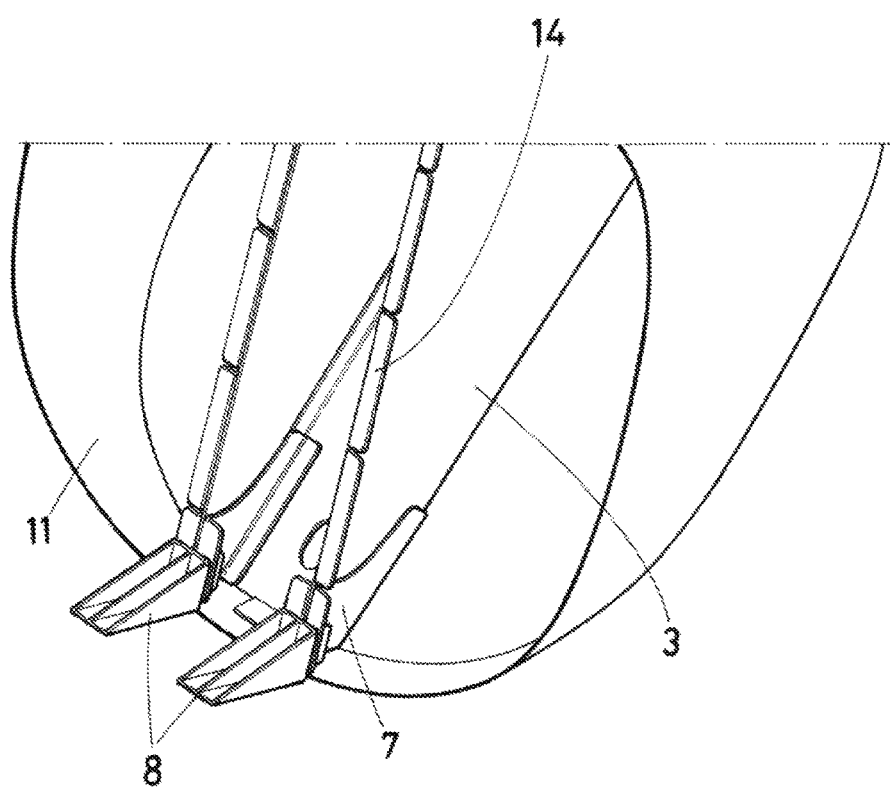
FIG. 4 shows another detail of the attachment of the vertical stabilizer in an aircraft rear structure according to the invention.

FIG. 4 shows a detail of the second attaching elements, which in turn comprise second angular fittings (7) and second backfittings (8). The second angular fittings (7) attach the second spar (3) to the second side of the rear pressure bulkhead (11) via second fastening elements (not shown) and the second backfittings (8) secure these second fastening elements from the first side of the rear pressure bulkhead (11).

Figure 5:
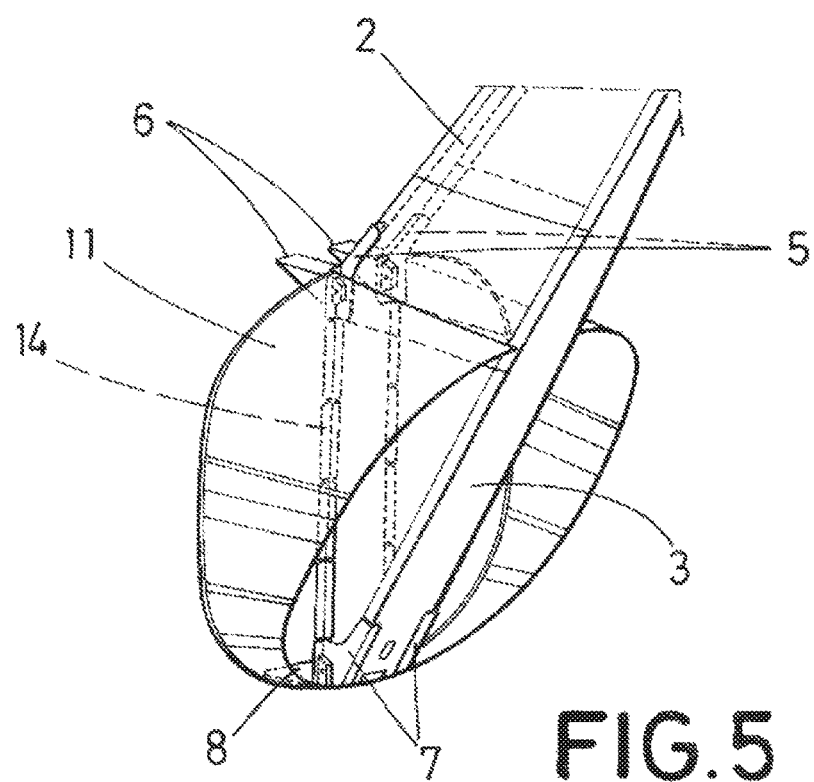
FIG. 5 shows another detail of the attachment of the vertical stabilizer in an aircraft rear structure according to the invention.

FIG. 5 shows a view of an aircraft rear structure according to the invention. In this case, this view sees the second side of the rear pressure bulkhead (11), instead of the first side, which was seen by FIGS. 3 and 4. In this figure, first angular fittings (5) and first backfittings (6) are seen attaching the first spar (2) to the second side of the rear pressure bulkhead (11) and second angular fittings (7) and second backfittings (8) are seen to attach the second spar (3) to the second side of the rear pressure bulkhead (11). Further, central angular fittings (14) located on the second side of the rear pressure bulkhead (11) are also observed.

Figure 6:
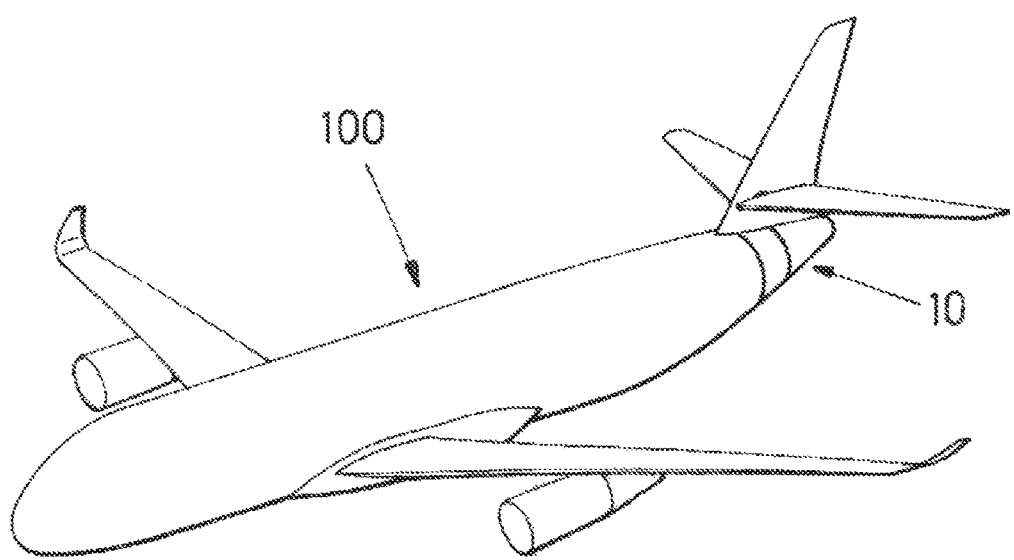
FIG. 6 shows an aircraft comprising an aircraft rear structure according to the invention.

FIG. 6 shows an aircraft (100) comprising an aircraft rear structure (10) according to the invention. It can be observed how no shell structure is needed, as loads are transmitted directly from the first and second spar of the vertical stabilizer directly to two different zones of the rear pressure bulkhead, reducing shear stress on the top of the fuselage.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft rear structure comprising:
  a rear pressure bulkhead wall, having a fore-facing first side and an aft-facing second side opposite to the first side,
  a horizontal stabilizer, and
  a vertical stabilizer comprising a first spar and a second spar,
    the first spar being attached to a first attachment zone of the second side of the rear pressure bulkhead wall via a pair of first attaching elements, a first attaching element in the pair of first attaching elements is laterally spaced across the first spar from a second attaching element in the pair of first attaching elements,
    the second spar being attached to a second attachment zone of the second side of the rear pressure bulkhead wall via a pair of second attaching elements, a first attaching element in the pair of second attaching elements is laterally spaced across the first spar from a second attaching element in the pair of second attaching elements, the second attachment zone being different from the first attachment zone;

wherein the pair of first attaching elements comprises a first pair of angular fittings and a first pair of backfittings and the second pair of attaching elements comprises a second pair of angular fittings and a second pair of backfittings.

2. The aircraft rear structure according to claim 1, wherein the first attachment zone corresponds with an upper zone of the rear pressure bulkhead wall and the second attachment zone corresponds with a lower zone of the rear pressure bulkhead wall.

3. The aircraft rear structure according to claim 1, wherein the first pair of angular fittings attaches the first spar to the second side of the rear pressure bulkhead wall via the first pair of fastening elements and the first pair of backfittings secure the pair of first fastening elements from the first side of the rear pressure bulkhead wall.

4. The aircraft rear structure according to claim 3, wherein the second pair of angular fittings attaches the second spar to the first side of the rear pressure bulkhead wall via the second pair of fastening elements and the second pair of backfittings secure the pair of second fastening elements from the first side of the rear pressure bulkhead wall.

5. An aircraft comprising an aircraft rear structure, comprising:

a rear pressure bulkhead wall, having a fore-facing first side and an aft-facing second side opposite to the first side, a horizontal stabilizer, and a vertical stabilizer comprising a first spar and a second spar, the first spar being attached to a first attachment zone of the aft-facing second side of the rear pressure bulkhead wall via a pair of first attaching elements, a first attaching element in the pair of first attaching elements is laterally spaced across the first spar from a second attaching element in the pair of first attaching elements, the second spar being attached to a second attachment zone of the aft-facing second side of the rear pressure bulkhead wall via a pair of second attaching elements, a first attaching element in the pair of second attaching elements is laterally spaced across the second spar from a second attaching element in the pair of second attaching elements, the second attachment zone being different from the first attachment zone;

wherein the pair of first attaching elements comprises a first pair of angular fittings and a first pair of backfittings and the second pair of attaching elements comprises a second pair of angular fittings and a second pair of backfittings.

\* \* \* \* \*